United States Patent
Fields

(12) 
(10) Patent No.: US 6,516,836 B2
(45) Date of Patent: Feb. 11, 2003

(54) MOTORIZED WASTE HOSE FOR RECREATIONAL VEHICLE

(76) Inventor: Reginald E Fields, 1827 Jethro Ave., Zion, IL (US) 60099

( * ) Notice: Subject to any disclaimer, the term of this patent is extended or adjusted under 35 U.S.C. 154(b) by 0 days.

(21) Appl. No.: 10/014,100

(22) Filed: Dec. 11, 2001

(65) Prior Publication Data

US 2002/0079017 A1 Jun. 27, 2002

Related U.S. Application Data

(60) Provisional application No. 60/257,409, filed on Dec. 22, 2000.

(51) Int. Cl.$^7$ .............................................. B65B 1/04
(52) U.S. Cl. ..................... 141/65; 141/301; 141/387; 4/321
(58) Field of Search ................... 141/65, 98, 387–389, 141/301; 4/321–323; 138/106, 109, 103, 121

(56) References Cited

U.S. PATENT DOCUMENTS

| 4,133,347 A | * | 1/1979 | Mercer |
| 5,023,959 A | * | 6/1991 | Mercer |
| 5,247,974 A | * | 9/1993 | Sargent et al. |
| 6,352,088 B1 | * | 3/2002 | Stegall |

* cited by examiner

*Primary Examiner*—Steven O. Douglas
(74) *Attorney, Agent, or Firm*—Michael A Mann; Nexsen Pruet Jacobs & Pollard LLC

(57) ABSTRACT

Draining of the waste tank of a recreational vehicle is improved by using a motor to operate the waste hose. The motor causes the proximal end of the hose to be extended from its housing in the RV while the distal end remains attached to the waste tan. The extended proximal end can then be inserted into the access pipe of a sewer system for draining the waste tank. The motor will retract the hose when the waste tank has been emptied. The motor is operable either by throwing a switch on the motor or pressing a button on a remote control unit.

18 Claims, 2 Drawing Sheets

MOTORIZED WASTE HOSE FOR RECREATIONAL VEHICLE

PRIORITY CLAIM

The applicant claims the benefit of the filing of U.S. provisional application serial No. 60/257,409 filed Dec. 22, 2000, which is incorporated herein by reference.

FIELD OF THE INVENTION

The present invention relates generally to the operation of the living quarters of recreational vehicles. More particularly, it relates to the expunging of the waste tank of the recreational vehicle.

BACKGROUND OF THE INVENTION

There are a many different types of recreational vehicles, often referred to as "RVs". One type of RV has living quarters that include a toilet, washing and kitchen facilities. The waste products from these are collected in an on-board tank that must be periodically expunged.

The process for expunging the waste tank is relatively straight forward. The RV must stop next to a sewer system access pipe, commonly found at RV parks, where the operator of the RV connects the waste tank via a hose to the access pipe. Then, a valve is opened to allow the waste from the tank to drain by gravity into the sewer system.

The hose is connected permanently to the RV waste tank and stored in a compartment toward the back of the vehicle. The hose is expandable that can be compressed to fit within its compartment, usually in the bumper, or stretched so that it can be inserted into the sewer system.

This operation may be straightforward, but it is also a disagreeable task. RV's are designed to allow relatively convenient draining of its waste tank and sewer system access pipes are available at convenient locations for RV travelers, but ultimately, the operator of the RV must still undertake the chore of draining the tank. Furthermore, the end of the hose becomes fouled with waste. Odors add to the disagreeable nature of the task.

Thus, there remains a need for improvements in the way the waste tank of an RV is emptied to lessen the disagreeable aspects of this chore.

SUMMARY OF THE INVENTION

According to its major aspects and briefly recited, the present invention is a motorized device to extend and retract the waste hose of an RV. The motorized device causes the proximal end of the hose to be extended from the RV so that it can be inserted into the access pipe of a sewer system and will retract it when the waste tank has been emptied. The device is operable either by throwing a switch to activate a motor or pressing a button on a remote control unit.

The use of a motor is an important feature of the present invention. The use of a motor obviates the need to physically pull the hose from its compartment and to push it back into the compartment, which are both disagreeable tasks.

The operation of the motor using a remote control is another feature of the present invention. The use of the remote also allows the RV operator conduct the procedure in part without having to go to a fixed set of controls.

These and other features and their advantages will be apparent to those skilled in the art of RV usage and design from a careful reading of the Detailed Description of Preferred Embodiments, accompanied by the following drawings.

DETAILED DESCRIPTION OF PREFERRED EMBODIMENTS

Figure 1:
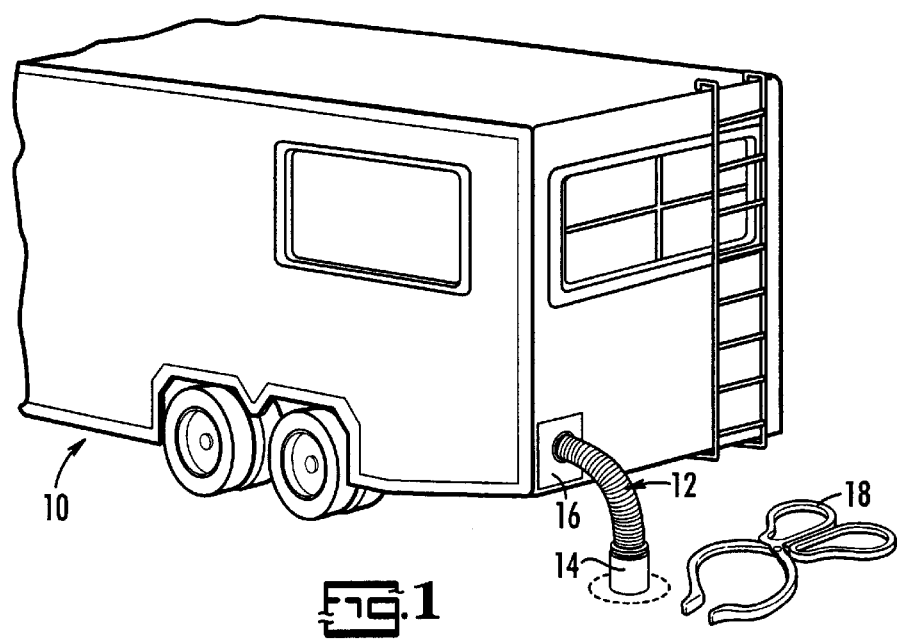
FIG. 1 is a perspective view of an RV with the waste hose connected to the access pipe of a sewer system.
Figure 2:
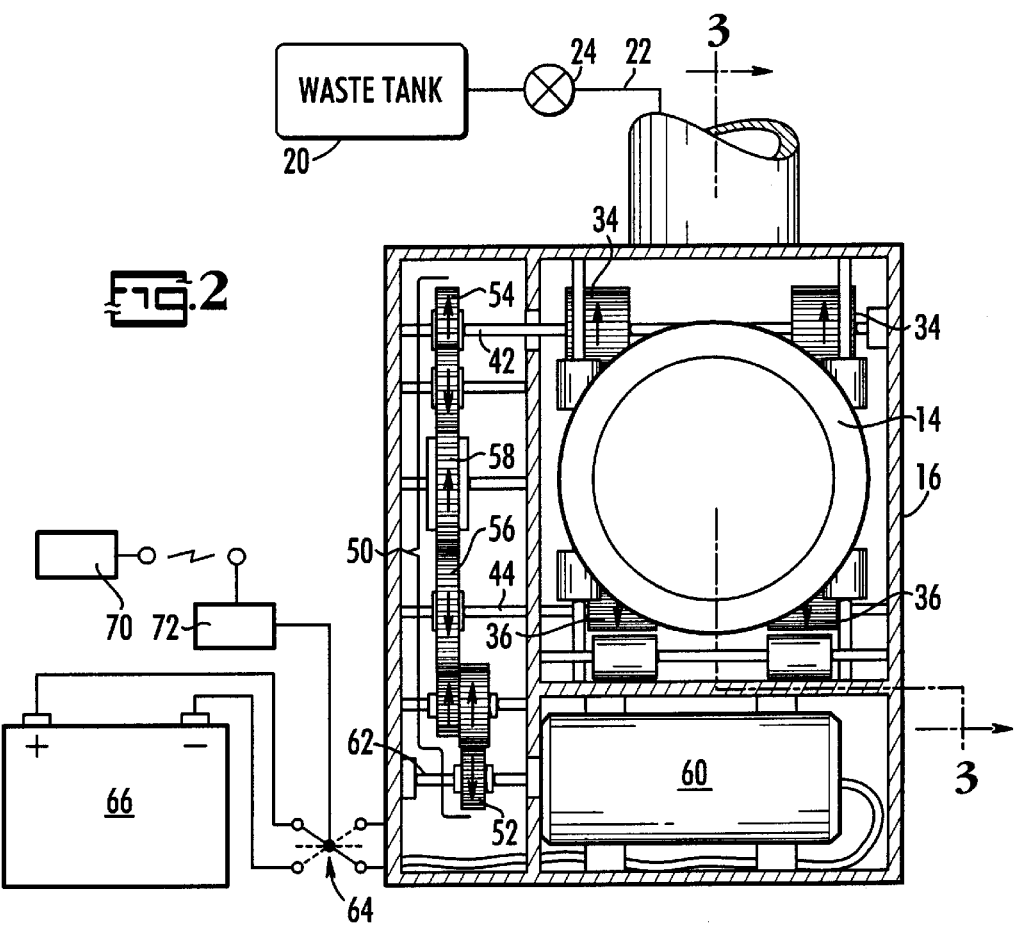
FIG. 2 is an end view and partial schematic view of the present motor according to a preferred embodiment of the present invention.

The present invention is a motorized device for use in extending and retracting a waste hose of a recreational vehicle (referred to herein as an "RV"). The invention is also the combination of a motor, controls for the motor, a waste hose and an RV.

The RV, whether part of the combination that is the invention or not, is one equipped with a waste tank that must periodically be drained. When it is drained, the waste from the waste tank is drained into a sewer system through an access pipe. The sewer system and access pipe, and the waste are of course not part of the present invention.

Referring now to the figures, there is illustrated an RV, generally indicated by reference number 10, having a waste hose 12 that can be inserted into a sewer system (not shown) via an access pipe 14. A housing 16 carries waste hose 12. Housing 16 preferably has a cover (not shown). For manipulation of the free end of the extended waste hose 12, a gripper 18, shown slightly enlarged in FIG. 1 for clarity, proves convenient.

FIG. 1 shows the waste hose 12 mounted to a left, rear corner of RV 10 but it will be clear that waste hose 12 can exit RV 10 from other parts of RV 10, including the sides and other areas of the back of RV 10. The bumper of an RV can double as a compartment for hose 12.

RV 10 has a waste tank 20 and a pipe 22 leading from and in fluid communication with waste tank 20. A valve 24 controls the flow of waste from waste tank 20 through pipe 22. When valve 24 is opened, the waste drains by gravity from waste tank 20 through pipe 22. When valve 24 is closed, no further waste may drain.

Figure 3:
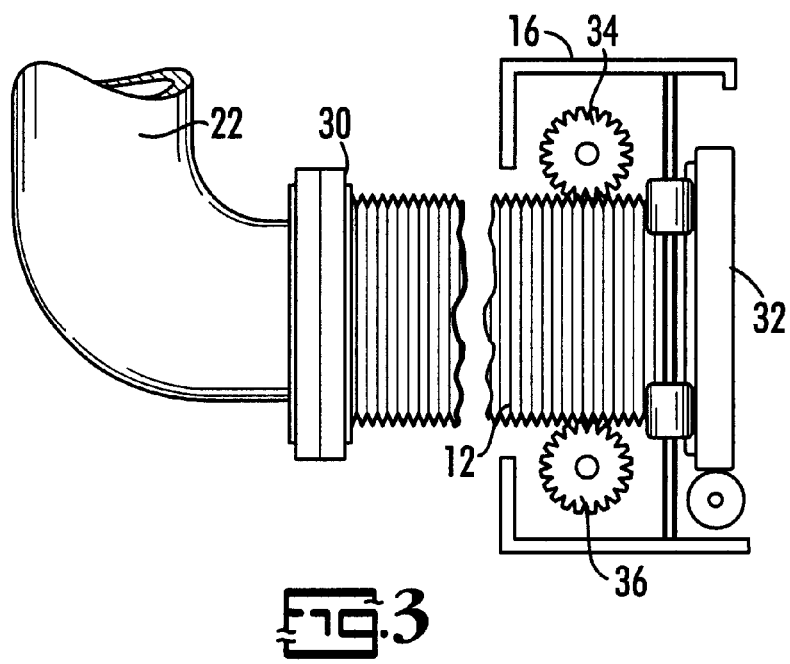
FIG. 3 is a side view of the present motor and waste hose in the retracted position, according to a preferred embodiment of the present invention.
Figure 4:
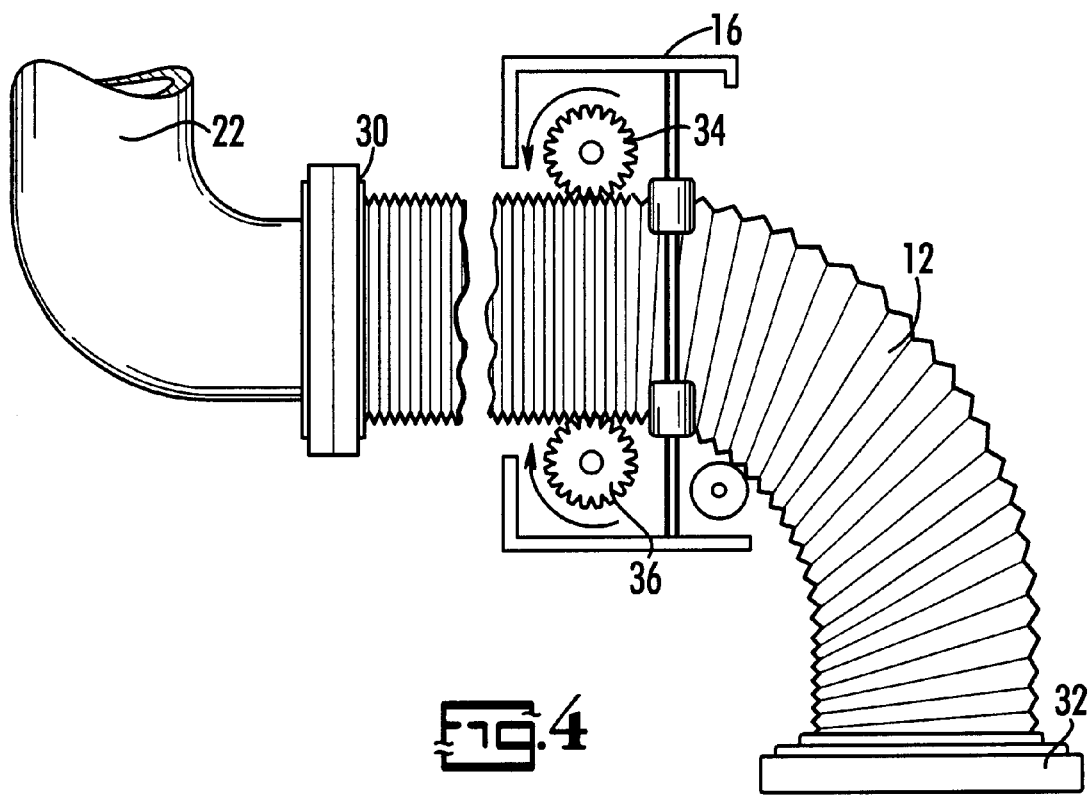
FIG. 4 is a side view of the present motor and waste hose in the extended position, according to a preferred embodiment of the present invention.

Waste hose 12 has a distal end 30 that is coupled to pipe 22, so that waste hose 12 is in fluid communication with waste tank 20, and a proximal end 32 near the exit of housing 16. Waste hose 12 is adapted to be stretched in length, preferably because of its ribbed or "accordian" or "corrugated" construction, as shown in FIGS. 3 and 4, so that hose 12 can be moved between a retracted position and an extended position by moving proximal end 32 with respect to distal end 30. By the term "extended", then, it is meant that proximal end 32 is moved so that the distance between it at distal end 30 is increased but that distal end 30 and proximal end 32 remain in fluid communication. Importantly, waste tank 20 and proximal end 32 also remain in fluid communication via the coupling between waste hose 12 and pipe 22 at distal end 30 when waste hose 12 is extended.

Inside housing 16 is means for extending waste hose 12. Preferably, rollers 34 and 36 are used to push proximal end 32 from housing 16, to the extended position from the retracted position, either mechanically or electro-mechanically thereby extending waste hose 12. Rollers 34 and 36 are affixed to shafts 42 and 44, respectively, which are mounted in bearings (not shown) carried by housing 16.

Shafts 42 and 44 are rotated using a system of gears 50 that accomplish several things. First, they rotate rollers 34 and 36 in opposing directions. As shown in FIGS. 3 and 4, when rollers 34 rotate counter-clockwise, rollers 36 rotate clockwise so that waste hose 12 is extended. When rollers 34 rotate clockwise, rollers 36 rotate counter-clockwise so that waste hose 12 is retracted. Second, gear system 50 causes the rotation of gears 34 and 36 at the same rate so that waste hose 12 is extended and retracted straight out of housing 16. Third, gear system 50 adjusts the rate at which waste hose 12 would otherwise be extended and retracted by a power source (to be described below) so that the extension and retraction takes place at a reasonable, controlled rate.

The composition and arrangement of gears in gear system 50 that is needed to achieve the foregoing requirements is well within the level of skill of those skilled in the art and clearly depends on the choice of gears, the distance between shafts 42 and 44, and the speed of a motor 60 driving the gears. However, there is preferably a driving gear 52 connected directly to motor 60, one driven gear 54 for shaft 42, one driven gear 56 for shaft 44 and one direction-reversing gear 58. Additional gears may be needed to step down the speed of an output shaft 62 of motor 60 and possibly to connect driving gear 52 with driven gears 54 and 56. Other arrangements are possible, such as using separate motors to drive shafts 42 and 44 and direct drive of one or both shafts 42 and 44.

Motor 60 is activated by a battery 66 of RV 10 via a switch 64. Switch 64 can be located at housing 16 or inside RV. In lieu of motor 60, a hand crank (not shown) can be easily substituted. Also, as an alternate to a switch 64 or in addition to switch 64, a remote control unit 70 can be used to transmit a signal to a receiver 72 that operates switch 64.

Switch 64 is preferably a three-way switch as shown, with an "off" position, a "forward" position" and a "reverse" position. In the forward position, waste hose 12 is extended by motor 60; in the reverse position, waste hose 12 is retracted by motor 60. Switch 64 may be switched to the off position when waste hose 12 has been retracted far enough or other features maybe incorporated to limit the rearward travel of waste hose 12, such as limit switches (not shown) that would automatically stop motor 60 when waste hose 12 had returned fully to housing 16. The maximum extension of waste hose 12 can be obtained when rollers 34 and 36 slip from their inability to further extend waste hose 12 or by incorporating an electrical contact that is closed when sufficient extension is obtained.

In operation, an RV operator stops RV near access pipe 14, closes switch 54 either manually by pressing a button or by using remote control unit 70 in electrical communication with a receiver 72, which is in turn in electrical connection with battery 66 and switch 64. Battery 66 energizes motor 60 which rotates output shaft 62. Gear system 50 causes shafts 42 and 44 to rotate which in turn rotates rollers 34, 36, respectively. Rollers 34, 36, extend proximal end 32 of waste hose 12 from motor housing so that the operator can merely place proximal end 32 into access pipe 14 using gripper 18. The valve 24 is opened and waste tank 20 drains by gravity. When waste tank 20 is drained, valve 24 is closed, gripper 18 is used to remove proximal end 32 of waste hose 12 from access pipe 14 and switch 64 is moved to the retract position. Motor 60 operates in reverse, based on reversal of its polarity and retracts waste hose 12. Gear system 50 operates in reverse to draw proximal end 32 of waste hose 12 back toward motor housing 16.

It will be apparent to those skilled in the art of electro-mechanical motors that many substitutions and modifications can be made to the preferred embodiments described above without departing from the spirit and scope of the present invention, which is defined by the appended claim.

What is claimed is:

1. A device for use with a recreational vehicle having a waste tank, said device comprising:

a housing;

a waste hose having a proximal end and a distal end, said distal end in fluid connection with said waste tank;

means for moving said waste hose between a retracted position inside said housing and an extended position wherein said proximal end is out of said housing while said distal end remains in fluid connection with said waste tank, said moving means including rollers engaging said waste hose, said waste hose moving, when said rollers rotate.

2. The device as recited in claim 1, wherein said moving means further comprises:

a motor;

means responsive to said motor for rolling said hose between said retracted and said extended positions.

3. The device as recited in claim 1, wherein said moving means further comprises:

a motor;

a shaft rotated by said motor; and a gear system responsive to said motor, said rollers being rotated by said gear system and moving said waste hose when said rollers are rotated.

4. The device as recited in claim 1, wherein said device further comprises means for limiting movement of said hose by said moving means.

5. A device for use with a recreational vehicle having a waste tank, said device comprising:

a housing;

a hose carried within said housing and having a proximal end and an a distal end, said distal end being in fluid communication with a waste tank of a recreational vehicle;

a motor in said housing;

a shaft rotated by said motor;

a gear system rotated by said shaft;

rollers rotated by said shaft and responsive to said motor, said rollers engaging and rolling said hose between said extended position, wherein said proximal end is out of said housing, and a retracted position, wherein said hose is in said housing; and control means for controlling said motor.

6. The device as recited in claim 5, wherein said hose is corrugated to stretch so that said distal end remains in fluid connection with said waste tank when said hose is in said extended position.

7. The device as recited in claim 5, further comprising means for limiting the movement of said hose by said moving means.

8. The device as recited in claim 5, wherein said control means is a remote control unit, said motor being responsive to said remote control unit.

9. The device as recited in claim 5, further comprising a power source for powering said motor.

10. The device as recited in claim 5, further comprising a gripper for manipulating said hose when said hose is moved to said extended position.

11. A device for use with a recreational vehicle, said recreational vehicle having a waste tank, a waste pipe extending from and in fluid communication with said waste tank, a valve governing fluid flow from said waste tank through said waste pipe, a bumper and a battery, said device comprising:

a hose carried within the bumper of a recreational vehicle and having a proximal end and an a distal end, said distal end being in fluid communication with a waste pipe of a recreational vehicle;

moving means responsive to said motor for moving said hose between a retracted position wherein said hose is in said bumper and an extended position wherein said proximal end is out of said bumper.

12. The device as recited in claim 11, wherein said moving means further comprises:

a pair of spaced-apart rollers through which said hose rolls between said extended and said retracted positions;

means for rolling said rollers.

13. The device as recited in claim 12, wherein said rolling means is a hand crank.

14. The device as recited in claim 12, wherein said rolling means further comprises:

a motor connected to a battery of said recreational vehicle;

a shaft rotatable by said motor;

a gear system rotated by said shaft, said gear system rotating said rollers to move said hose between said extended and said retracted positions.

15. The device as recited in claim 12, wherein said rolling means further comprises means for controlling said rolling means.

16. the device as recited in claim 15, wherein said rolling means is a remote control unit.

17. The device as recited in claim 14, wherein said rolling means further comprises means for limiting movement of said hose.

18. The device as recited in claim 14, wherein said hose is corrugated to allow said hose to stretch so that said distal end remains attached to said waste pipe when said proximal end is in said extended position.

* * * * *